United States Patent [19]
Reddersen et al.

[11] Patent Number: 5,330,370
[45] Date of Patent: Jul. 19, 1994

[54] MULTIPLE-INTERFACE SELECTION SYSTEM FOR COMPUTER PERIPHERALS

[75] Inventors: Brad R. Reddersen, Eugene; Phillip W. Shepard, Elmira; Rockie D. Moch, Eugene, all of Oreg.

[73] Assignee: Spectra-Physics Scanning Systems, Inc., Eugene, Oreg.

[21] Appl. No.: 34,189

[22] Filed: Mar. 22, 1993

Related U.S. Application Data

[63] Continuation of Ser. No. 788,267, Nov. 4, 1991, abandoned.

[51] Int. Cl.⁵ .......................................... H01R 13/00
[52] U.S. Cl. ................................................ 439/502
[58] Field of Search ............... 439/67, 77, 329, 491, 439/493, 498, 499, 502, 505, 514, 515, 680

[56] References Cited
U.S. PATENT DOCUMENTS

| | | | |
|---|---|---|---|
| 4,678,288 | 7/1987 | Lonsdale et al. | 350/432 |
| 4,694,182 | 9/1987 | Howard | 250/566 |
| 4,699,447 | 10/1987 | Howard | 350/6.9 |
| 4,820,193 | 4/1989 | Noorily | 439/491 |
| 4,941,845 | 7/1990 | Eppley et al. | 439/502 |
| 4,954,101 | 9/1990 | Nelson | 439/502 |
| 5,037,308 | 8/1991 | Bryce et al. | 439/505 |
| 5,160,276 | 11/1992 | Marsh et al. | 439/502 |
| 5,177,665 | 1/1993 | Frank et al. | 439/502 |
| 5,192,226 | 3/1993 | Wang | 439/502 |
| 5,250,792 | 10/1993 | Swartz et al. | 235/472 |

*Primary Examiner*—Joseph H. McGlynn
*Attorney, Agent, or Firm*—Lyon & Lyon

[57] ABSTRACT

An interface selection and configuration system for a computer peripheral in which configuration for the peripheral is at least in part accomplished by the interface connector cable. In a preferred embodiment, the computer peripheral is equipped with one or more hardware interfaces. The interface connector cable has a first end connector for attaching to the computer peripheral. The first end connector of the interface connector cable is typically a multiple pin connector constructed and arranged to be properly physically and electrically connectable only to a specific computer peripheral or class of computer peripherals, the first end connector including at least one electrical connection between two pins for completing a circuit within the computer peripheral thereby enabling the computer peripheral.

32 Claims, 2 Drawing Sheets

MULTIPLE-INTERFACE SELECTION SYSTEM FOR COMPUTER PERIPHERALS

This is a continuation of co-pending application(s) Ser. No. 07/788,267 filed on Nov. 4, 1991, now abandoned.

BACKGROUND OF THE INVENTION

The field of the present invention relates to interconnection systems for computers and computer peripherals or more specifically, methods and devices for selecting proper interface between a computer peripheral and its host computer.

Host computers need to be interconnected to a wide variety of peripheral devices including printers, scanners, monitors, and controllers among others. When the host computer is being connected to a certain type of peripheral, for example a handheld laser scanner, the computer typically has a single input/output connector to which the scanner may be connected by an interconnect cable. It is frequently desireable that a particular handheld scanner be usable with a variety of different host computers. Conversely, it is also desirable that the host computer be able to support a variety of different handheld scanners.

Heretofore there have been several systems for achieving proper configuration between the host computer and the peripheral. In a typical system, a particular peripheral is configured to work with a particular host computer, that is, the peripheral contained a single dedicated interface. Similarly, the host computer was configured to accept only a particular type of peripheral. Any time the peripheral was moved to a different host computer, it was necessary to replace the interface software and hardware in the peripheral.

The host computer may include a software selection program in which the user inputs information identifying the particular peripheral enabling the system to have proper operation. Such an operation requires the user to correctly input information into the host computer identifying the particular peripheral. Alternately, means are provided for scanning a code on the outside of the peripheral which informs the computer of the type of peripheral. Some peripherals actually include identifying signals which again inform the particular host of the type of peripheral and software provides the desired configuration. Many of these systems still require correct interface hardware.

In another configuration technique, the peripheral includes interface hardware for more than one host computer. When configuring, the printed circuit board of the peripheral requires certain hardware configuration in order to be correctly linked to a host computer. Such hardware configuration may be effectuated by manually actuable external switches or by internal switches or "jumpers" within the printed circuit board (and/or within the host computer) which activate or deactivate certain components. Such an operation typically requires the expertise of an electronics technician or skilled user and is not a desirable field operation to be performed by the typical user. It is desirable to have an inexpensive and easy to use interconnection system which can be effectively used by the average user.

SUMMARY OF THE INVENTION

The present invention relates to an interface selection system for a computer peripheral in which configuration for the peripheral is at least in part accomplished by the interface connector cable. In a preferred embodiment, the computer peripheral is equipped with one or more hardware interfaces. The interface connector cable has a first end connector for attaching to the computer peripheral. The first end connector of the interface connector cable is typically a multiple contact connector (such as pin or edge connector) constructed and arranged to be properly physically and electrically connectable only to a specific computer peripheral or class of computer peripherals, the first end connector including at least one electrical connection between two contacts for completing a circuit within the computer peripheral thereby enabling the computer peripheral.

DESCRIPTION OF THE PREFERRED EMBODIMENT

The preferred embodiments will now be described with reference to the drawings.

Figure 1:
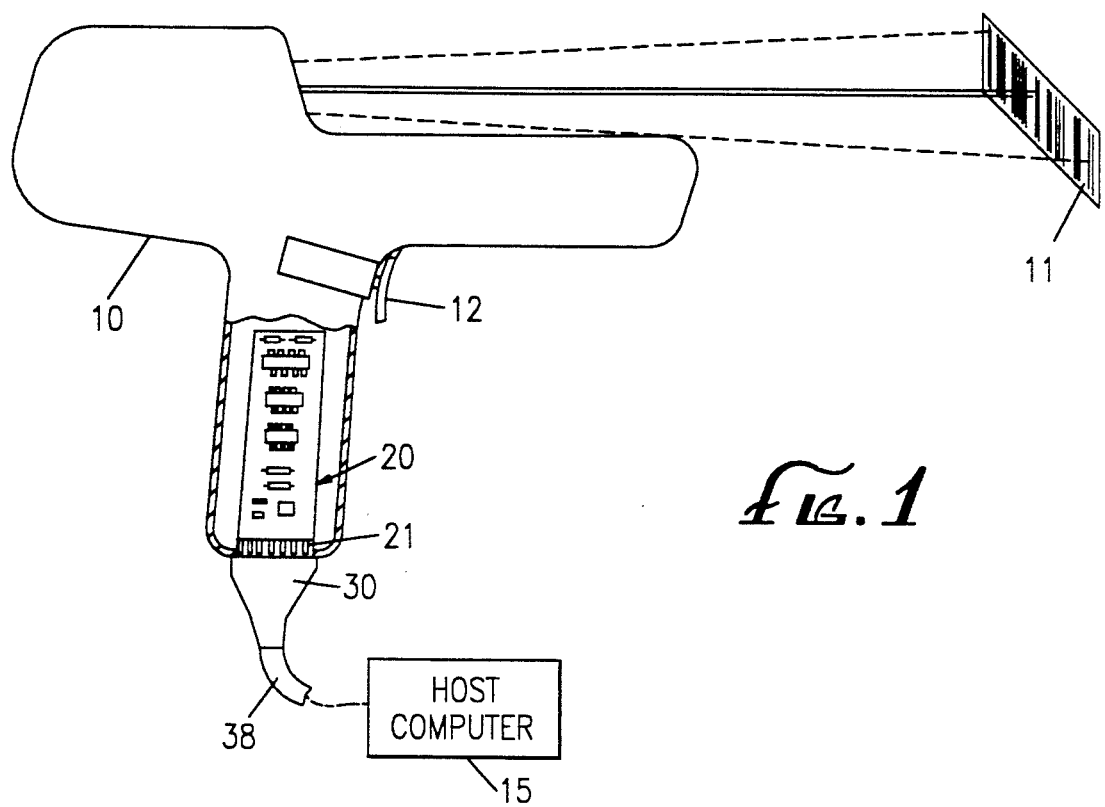
FIG. 1 is a diagrammatic view of a handheld laser scanner attached to a host computer according to the present invention.

In FIG. 1, an example computer peripheral is illustrated as a handheld laser scanner 10 used for scanning a bar code 11. The scanner 10 is operably connected to a host computer 15 via an interconnect cable 38. The interconnect cable 38 includes an end plug or edge connector 30 which connects to a mating connector 21 on the end of a printed circuit board 20 within the scanner 10. The interconnect cable 38 provides a communication link between the host computer 15 and the laser scanner 10 and may also provide power to the scanner 10.

Figure 2:
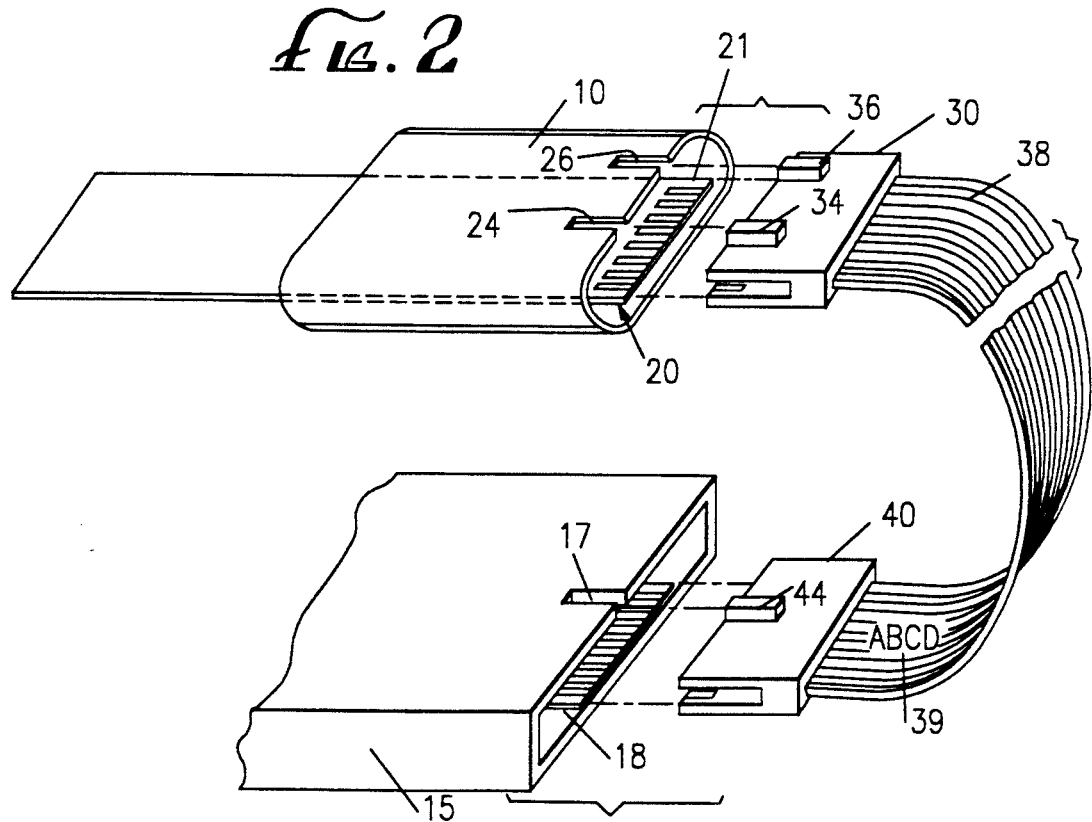
FIG. 2 is a diagrammatic view of an interface connector system according to the present invention.

Referring to FIG. 2, the interconnect cable 38 has a first end connector 30 which plugs into the scanner 10 attaching to the edge connector 21 of the circuit board 20, and a second end connector 40 which plugs into the host computer 15 attaching to the edge connector 18. The first end connector 30 includes tabs 34, 36 which slide into and mate with corresponding slots 24, 26 in the body of the handle of the scanner 10. Different types of scanners may be equipped with different positions of the slots 24, 26. Only an end connector 30 having the correct configuration of tabs 34, 36 will be correctly physically connectable to the scanner 10. An interconnect cable 38 without the correct tab configuration cannot physically be plugged into the laser scanner 10.

Similarly on the host computer side of the interconnect cable 38, the second end connector 40 is equipped with a tab 44 which mates with a corresponding slot 17 at the mating edge connector 18 of the host computer 15. Only an end connector 40 having the correct configuration of the tab 44 will be correctly physically connectable to the host computer 15. An interconnect cable 38 without the correct tab configuration cannot physically be plugged into the host computer 10.

Therefore in order to connect a particular peripheral (such as a scanner 10) to a particular host computer, a cable having the correct tab configurations at both end connectors must be selected. The unique physical configurations ensures that the user must select the correct cable for the host computer and peripheral pair. The preferred embodiment may only require tab configuration on the host computer end because it is not anticipated that the various handheld scanners will require the dedicated interconnect cables, but tab configurations on the peripheral end may be desired in other peripheral applications. Further, the tab configurations illustrated are but one example means for ensuring proper interconnect cable selection. The tabs and slots are readily added to conventional end connectors. The design illustrated does not prevent end connectors without tabs from connecting to the peripheral 10 and the host computer 15, but such design may be modified by one skilled in the art to prevent such connection.

Figure 3:
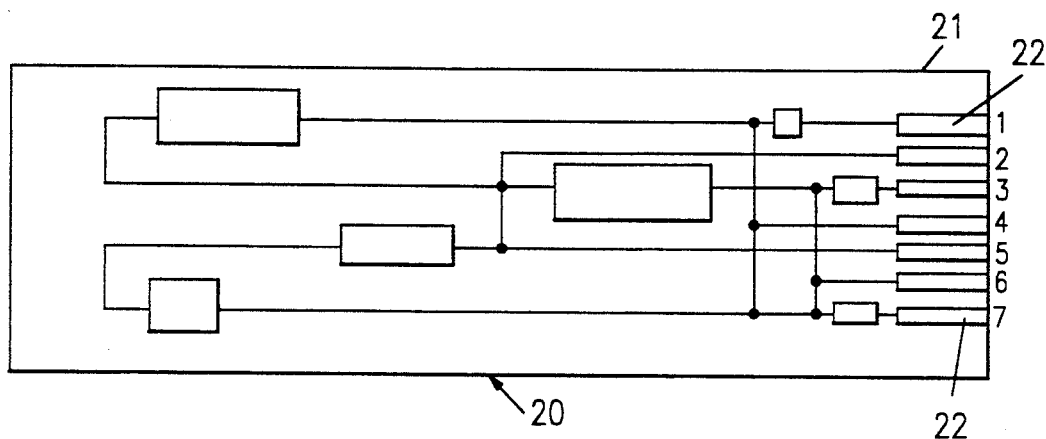
FIG. 3 is a detailed diagrammatic view of a printed circuit board of FIG. 2.
Figure 4:
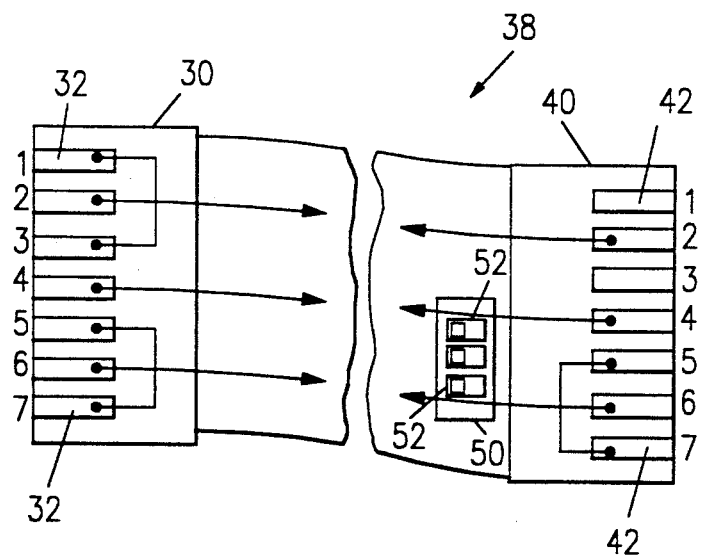
FIG. 4 is a detailed diagrammatic view of an edge connector as in FIG. 2.

Referring to FIGS. 3 and 4, the printed circuit board 20 (located within the scanner 10) includes an edge connector 21 shown with seven edge contacts 22 (numbered 1 through 7). Though there is a distinction between edge contacts and pins, for the purposes of the present invention, they are interchangeable—a pin connector with its mating plug connector may be interchanged for an edge connector pair or any other suitable electrical contact pair.

The board 20 is designed and constructed to be operable with a number of host computers by way of an externally activated hardware configuration provided by the interconnect cable 38. As viewed in FIG. 4, in the edge connector 30, the edge contacts #5 and #7 are electrically connected, illustrated as being "jumped". Edge contacts #1 and #3 are also jumped while edge contacts #2, #4 and #6 are used for communication. When the interconnect cable 38 is plugged into the printed circuit board 20, edge contacts #1 and #3 of the edge connector 21 are thereby electrically connected, and edge contacts #5 and #7 are also electrically connected. By so electrically connecting these electrical contacts, certain circuits within the circuit board 20 become electrically connected resulting in a desired configuration. The scanner 10 becomes configured to accept a particular host computer 15. The user has configured the scanner merely by plugging in the correct interconnect cable 38.

A similar configuration selection system may alternately or in combination be applied to the host computer connection side. The edge connector 40 has certain of its edge contacts 42 electrically connected, in the illustrated example pins #5 and #7 of the edge connector 40 are jumped. When the edge connector 40 is plugged into the edge connector 18 of host computer 15, edge contacts #5 and #7 within the edge connector 18 become electrically connected, completing a circuit within the host computer 15, thereby configuring the host computer 15 for the particular peripheral. The user may therefore configure the host computer 15 for the particular scanner 10 by merely selecting and plugging in the correct interconnect cable 38.

In practice, the user would be provided with a single peripheral, such as a scanner and several interconnect cables. To connect the scanner, the user would merely select the interconnect cable corresponding to the particular host computer and plug it into the scanner. The interconnect cable would then configure the scanner for the particular host computer. To move the scanner to a different host computer, the user would merely have to switch cables. The interconnect cable 38 may be provided with means for identifying such as identifying markings 39 imprinted directly on the interconnect cable 38 itself, color coding, or the like to assist the user in selecting the correct interconnect cable for the given host computer.

The illustrated seven edge connector embodiment is a simplified example for a connector design. Electrical contact configurations may of course be more or less than seven contacts (and the two ends need not be the same). In a preferred scanner application, an interconnect cable plug with 30 pins is set forth in Table A as follows:

TABLE A

| Pin # | Signal Name | Data Direction(s) |
|---|---|---|
| 1 | TEST_DATA | <———> |
| 2 | READ_DATA_WAND | ———> |
| 3 | START_DATA | <——— |
| 4 | CLOCKIN | <——— |
| 5 | CLOCKOUT | <——— |
| 6 | RDATA_RTN | ———> |
| 7 | SDATA_RTN | <——— |
| 8 | CLOCK_IN RTN | <——— |
| 9 | CLOCK_OUT_RTN | <——— |
| 10 | VCC | <——— |
| 11 | VCC_OUT | ———> |
| 12 | VCC_IN | <——— |
| 13 | CLEAR_TO_SEND | |
| 14 | TRANSMIT_DATA | |
| 15 | RETURN_DATA | |
| 16 | RETURN_S | |
| 17 | DATA_PLUS | |
| 18 | DATA-MINUS | |
| 19 | BEEP_IN | |
| 20 | PWR_EN | |
| 21 | TRIGGER | |
| 22 | BAR_CODE_OUT | |
| 23 | GOOD_READ_IN | |
| 24 | START_OF_SCAN | |
| 25 | MTR_FAIL | |
| 26 | GROUND | |
| 27 | CONFIG_1 | |
| 28 | CONFIG_2 | |
| 29 | CONFIG_3 | |
| 30 | CONFIG_4 | |

The interconnect cable plug may use certain of the pins for communication or power. Some of the pins may be unused and available for other applications, it being desireable that the same pin design be usable for different configurations. The last four pins #27–#30 are dedicated for providing the configuration for the peripheral. The variations of configurations are limitless and may be designed to suit a particular application. The example in Table A is provided in part to show the wide variety of configurations that may be employed.

Though particular types of end connectors have been described, the pin connector may be any suitable electrical connector means for providing electrical contact including plugs, pin connectors, sockets, edge connectors and the like. The end connector has multiple contacts, the contacts providing the actual electrical contact surface. The contacts may be pins, edge contacts, plugs, sockets, or any suitable electrical contact element.

The center of the interconnect cable 38 may comprise any suitable transmission medium including a wire (as illustrated), cable, fiber optic cable, radio frequency link, infra red light link, or other transmission medium.

The cable configuration system described may be combined with other configuration systems, some of which have been previously described. For example, the interconnect cable system described herein may be used to automatically select a configuration for a certain class or group of peripherals. The peripheral may additionally include external (or internal) switches identifying the particular peripheral within the group thereby completing the described configuration.

In practice, a computer peripheral such as a laser scanner 10 will be equipped with hardware and firmware so that it may be used with a plurality of different host computers or computer terminals. To provide initial configuration or change configuration when switching host computers, the peripheral is configured merely by selecting the correct interconnect cable 38. The electrically connected pins in the end connector of the interconnect cable provide the switching necessary within the scanner 10, activating or deactivating certain circuits, thereby configuring the scanner 10 for the particular host computer.

The interconnect cable 38 may be designed in any suitable manner. In FIGS. 3 and 4 illustrate jump connections between the respective edge contacts 32 of edge connector 30 (or edge contacts 42 of edge connector 40), other electrical connection mechanisms may be employed. The contacts may be electrically connected by a simple hard wire connection. The interconnect cable 38 itself may include a printed circuit board which provides the desired electrical connection between the pins. The interconnect cable 38 (or the printed circuit board 50 thereon) may itself be equipped with dip switches 52 (dual inline package switches) or some other type of switch. An interconnect cable equipped with switches would have certain advantages as only one cable version need be manufactured. The cable type corresponding to a particular peripheral would be selected by the switches and the cable could then stamped with an identifying code 39.

Thus, a peripheral configuration system and method have been shown and described. Though certain examples and advantages have been disclosed, further advantages and modifications may become obvious to one skilled in the art from the disclosures herein. The invention therefore is not to be limited except in the spirit of the claims that follow.

I claim:

1. An interface configuration system for a computer peripheral comprising:
   (1) a given first host computer;
   (2) a computer peripheral having (a) at least two internal configuration selection circuits and (b) sufficient internal hardware and/or firmware to be internally configurable for at least the given first host computer and a given second host computer selectable by actuation of a given one or more of said internal configuration selection circuits; and
   (3) an interface connector cable having a first end connectable to the computer peripheral and a second end connectable to the given first host computer,
   wherein the first end of the interface connector cable includes a multiple contact connector constructed and arranged to be properly physically and electrically connectable to a specific computer peripheral or class of computer peripherals,
   wherein the first end of the interface connector cable includes at least one electrical connection between two contacts which, when the first end of the interface connector cable is plugged into the computer peripheral, completes the given one or more of said internal configuration selection circuits within the computer peripheral thereby configuring the internal hardware and/or firmware of the computer peripheral to correspond to the given first host computer as opposed to the given second host computer.

2. An interface configuration system according to claim 1 wherein the computer peripheral comprises a laser scanner.

3. An interface configuration system according to claim 1 wherein the multiple contact connector is selected from the group consisting of: edge connectors, pin connectors, plugs, and sockets.

4. An interface configuration system according to claim 1 wherein the second end of the interface connector cable includes a multiple contact connector constructed and arranged to be properly physically and electrically connectable only to a specific host computer or class of host computers.

5. An interface configuration system according to claim 1 further comprising means for ensuring correct interface connector cable selection for the computer peripheral.

6. An interface configuration system for a computer peripheral with at least a first internal configuration and a second internal configuration, comprising an interface connector cable connectable at one end to the computer peripheral and in communication to a host computer, the interface connector cable including
   a first end connector attachable to the computer peripheral, the first end connector having multiple contacts; and
   a second end connector providing communication to the host computer, wherein the interface connector cable includes at least one electrical connection between two contacts for completing an internal configuration selection circuit within the computer peripheral thereby internally configuring the computer peripheral to the first internal configuration as opposed to the second internal configuration.

7. An interface configuration system according to claim 6 wherein the computer peripheral comprises a laser scanner.

8. An interface configuration system according to claim 6 wherein the multiple contact connector is selected from the group consisting of: edge connectors, pin connectors, plugs, and sockets.

9. An interface configuration system according to claim 6 further comprising means for ensuring correct interface connector cable selection.

10. An interface configuration system according to claim 6 wherein the first end connector of the interface connector cable is constructed and arranged to be properly physically and electrically connectable only to a specific computer peripheral or group of computer peripherals.

11. An interface configuration system according to claim 6 wherein the second end connector of the interface connector cable is constructed and arranged to be properly physically and electrically connectable only to a specific host computer or group of host computers.

12. A method for configuring a computer peripheral for a given host computer, comprising the steps of:
   supplying the computer peripheral with sufficient internal hardware and/or firmware to be configurable for at least a first host computer and a second host computer;
   equipping the computer peripheral with a multiple contact connector and with at least two internal configuration selection switches, the computer peripheral being selectively configured for a given host computer by actuating a given one or more of said internal configuration selection switches; and actuating the given one or more of said internal configuration selection switches for configuring the computer peripheral for the first host computer as opposed to the second host computer by:

selecting a matching interconnect cable which matches the computer peripheral and the first host computer, the interconnect cable having a first end connector for attaching to the computer peripheral and closing an electrical circuit between contacts in the multiple contact connector of the computer peripheral by attaching the first end connector of the matching interconnect cable to the computer peripheral, the first end connector having certain of its contacts electrically interconnected.

13. A method for configuring a computer peripheral according to claim 12 wherein the multiple contact connector is selected from the group consisting of: edge connectors, pin connectors, plugs, and sockets.

14. A method for configuring a computer peripheral according to claim 12 wherein the computer peripheral comprises a laser scanner.

15. A method for configuring a computer peripheral according to claim 12 further comprising the step of ensuring a correct interface connector cable is selected for the given host computer and the computer peripheral.

16. A computer peripheral system comprising:

a computer peripheral having (a) at least two internal configuration selection circuits and (b) sufficient internal hardware and/or firmware to be internally configurable for at least a given first application and a given second application selectable by actuation of a given one or more of said internal configuration selection circuits; and a communication link between a given host computer and the computer peripheral, the communication link including an interface connector cable having a first end connectable to the computer peripheral, the first end of the interface connector cable including (a) a multiple contact connector constructed and arranged to be physically connectable to a specific computer peripheral or class of computer peripherals and (b) at least one connection path between two contacts which, when the first end of the interface connector cable is plugged into the computer peripheral, completes the given one or more of said internal configuration selection circuits within the computer peripheral thereby internally configuring the computer peripheral for the given first application as opposed to the given second application.

17. A computer peripheral system according to claim 16 wherein the interface connector cable comprises a continuous wire cable extending between the first end of the interface connector cable at the computer peripheral to a second end of the interface connector cable at the host computer and wherein the at least one connection path is electrical.

18. An interface connector cable for configuring a computer peripheral for a particular application or host computer, comprising a first end connector connectable to the computer peripheral, the first end connector having at least one electrical connection between two contacts for completing an internal configuration selection circuit within the computer peripheral thereby internally configuring the computer peripheral for the particular application or host computer as opposed to some other application or host computer.

19. An interface connector cable according to claim 18 further comprising an identifying code located on an outer surface of the interface connector cable, the identifying code corresponding to the particular application or host computer.

20. A method for internally configuring a computer peripheral for a given application as opposed to some other application, comprising the steps of
 (1) identifying the computer peripheral;
 (2) identifying the given application for which the computer peripheral will be used;
 (3) selecting a correct interface connector cable by identifying a connector cable having an identifying code corresponding to the computer peripheral and the given application identified in steps (1) and (2); and
 (4) connecting a first end of the interface connector cable into a mating connector on the computer peripheral which comprises establishing electrical connection between certain contacts in the mating connector thereby actuating a given one or more internal configuration selection switches within the computer peripheral to select a desired internal configuration of the computer peripheral corresponding to the given application as opposed to some other application.

21. A method according to claim 20 wherein the step of connecting the first end of the interface connector cable into a mating connector on the computer peripheral comprises enabling and/or disabling certain hardware and/or firmware within the computer peripheral.

22. A method for setting a desired internal configuration of an electronic device to a predetermined set of values, comprising the steps of:

supplying the electronic device with sufficient internal circuitry having internal configuration of at least one internal variable;

connecting a connector cable to the electronic device;

setting the internal variable to one of the predetermined set of values in response to whether or not a circuit is formed between a predetermined first contact and a predetermined second contact in the connector cable upon the connector cable being connected to the electronic device.

23. A method according to claim 22 further comprising the step of selecting the connector cable being connected on the basis of a code applied to the connector cable which identifies the desired internal configuration for the electronic device.

24. A method according to claim 22, wherein the electronic device comprises a peripheral device connectable to a host device by the connector cable, the method further comprising the steps of connecting the connector cable to a given host device and selecting the connector cable being connected on the basis of a code applied to the connector cable which identifies the given host device.

25. A method of operating a handheld scanner for data reading, the handheld scanner including a scanner body and a connector cable, comprising the steps of:

detachably connecting the connector cable to the scanner body;

changing a function of the scanner by changing the connector cable.

26. A method according to claim 25 wherein the step of changing a function comprises changing a value of an internal configuration parameters of the scanner.

27. A handheld scanner for data reading comprising:
a body portion;
a scanning mechanism mounted within the body portion;
a connector cable detachably connectable to the body portion, said connector cable being electrically connected to the scanning mechanism when the connector cable is attached to the body portion, the connector cable being changeable by connecting to and being disconnected from the body portion wherein a function of the scanner may be changed by changing the connector cable.

28. A handheld scanner according to claim 27 wherein the body portion includes a scan head containing the scanning mechanism and a handle portion having a first end attached to the scan head and a second end, wherein the connector cable is detachably connectable to the second end.

29. A method according to claim 25 wherein the step of changing a function comprises selecting interface hardware in the scanner corresponding to a given application.

30. A method according to claim 29 further comprising manually setting switches in the scanner to complete interface hardware selection.

31. A method according to claim 29 wherein the step of changing a function further comprises manually setting switches on the connector cable.

32. A method according to claim 29 further comprising the step of selecting the connector cable being connected on the basis of a code applied to the connector cable which identifies the given application for the scanner.

* * * * *